3,333,011
PRODUCTION OF CHLOROTRIFLUOROETHYLENE
Louis G. Anello, Basking Ridge, and Cyril Woolf, Morristown, N.J., assignors to Allied Chemical Corporation, New York, N.Y., a corporation of New York
No Drawing. Filed Oct. 1, 1963, Ser. No. 312,851
7 Claims. (Cl. 260—653.5)

This invention relates to manufacture of 1,1,2-trifluoro-2-chloroethylene, $CClF=CF_2$, a commercially important monomer.

Production of chlorotrifluoroethylene is usually effected commercially by reduction of $CCl_2FCClF_2$ by zinc dust in the presence of anhydrous solvents such as acetamide, 2-ethylhexanol, ethanol, etc. In view of the evident cost disadvantages entailed in the use of expensive zinc and anhydrous organic solvents, several proposals have been made as to production of chlorotrifluoroethylene by catalytic reaction of $CCl_2FCClF_2$ and hydrogen. In prior catalytic methods, various metals and metal compounds including chromium oxide and copper-chromium oxides have been suggested for use as catalysts. However, with regard to such reactions, chromium oxides usually require relatively high reaction temperatures. As to prior copper-chromium oxide catalysts, experience indicates good initial activity but relatively short catalyst life.

In accordance with this invention, it has been found that an added alkaline earth component, such as barium oxide, promotes activity and substantially increases catalyst longevity. Further, we find that the herein described catalysts, which on the basis of their constitution might be expected to cause addition of hydrogen to organic compounds, nevertheless unexpectedly not only effect removal by hydrogen of chlorine from certain chlorofluorocarbon starting materials but also do not cause saturation of unsaturated sought-for products. Hence, it has been found that chlorotrifluoroethylene may be prepared advantageously by reacting hydrogen with $CF_2ClCFCl_2$ in vapor phase while in the presence of the herein catalysts. The invention provides an easily controllable, all gas-phase catalytic reaction which, we find further, may be carried out at ordinary pressure and at relatively low temperature. Major reaction appears to proceed in accordance with

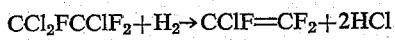
$$CCl_2FCClF_2 + H_2 \rightarrow CClF=CF_2 + 2HCl$$

In general practice, a vaporous mixture of hydrogen and $CCl_2FCClF_2$ is passed, at temperatures substantially in the range of 325–425° C., through a reactor charged with the catalysts described to thereby effect formation of $CClF=CF_2$. The reactor exit gases—containing sought-for $CClF=CF_2$ and some $CHF=CF_2$ along with some unreacted hydrogen and $CCl_2FCClF_2$ organic starting material—may be handled by conventional methods to recover chlorotrifluoroethylene.

The dehydrochlorination catalysts employed in accordance with the invention may be considered as alkaline earth metal (including magnesium) oxide promoted copper chromites. Usually, the alkaline earth metal is selected from the group consisting of barium and calcium, and the preferred alkaline earth metal is barium. In general, these catalysts are derived and characterized by having been precipitated from solutions containing ammonium dichromate and soluble salts of copper and e.g. barium; decomposed or ignited at elevated temperatures to liberate nitrogen and water from the precipitated ammonium chromate; and subjected to heat treatment at elevated temperatures in the presence of hydrogen. Representative catalysts and process for making same are given in the appended examples. The catalysts may be prepared by coprecipitation of copper and barium hydroxides along with ammonium chromate, from solutions of ammonium dichromate and the nitrates of copper and barium by addition of a solution of ammonium hydroxide, followed by filtering, washing, and drying the filter cake. In this circumstance the filter cake comprises a complex probably $Ba(OH)_2.2Cu(OH).NH_4CrO_4$. Ammonium carbonate may be used as precipitating agent in which instance the filter cake comprises a complex of barium-ammonium-chromium carbonates. Constituents of the initial filter cakes may be ignited and decomposed to the oxides, by liberation of nitrogen and water, by heating in air, in such manner as to avoid violent gas evolution, for several hours at temperatures gradually rising to about 320–350° C. The decomposed material may be granulated, pressed into pellets or shaped into other desirable physical form. Prior to use as catalysts, the material may be placed in the reactor subsequently to be used for catalysis, and subjected to heat treatment in the presence of a stream of hydrogen while slowly raising temperature over a substantial period of time e.g. 3 to 5 hrs., up to say 300–400° C. To prevent excessive temperature rise and local overheating, hydrogen may be diluted with nitrogen or other inerts. The catalytic material both before and after hydrogen treatment is substantially black to dark brown, and there is no substantial change in color even after the material is used as a catalyst. In the finished catalyst, chromium is in the oxide form believed to be $Cr_2O_3$, and barium is thought to be in the form of BaO. The exact form of the copper in the finished catalysts, i.e. after hydrogen treatment, is not known. While during hydrogen treatment at elevated temperatures, it appears that chromium and barium remain in the unreduced forms, $Cr_2O_3$ and BaO, extent of reduction if any of copper oxide is not known. On the basis of the substantially black color of the finished catalysts, as distinguished from the red color of known copper-chromium oxide catalysts containing metallic copper, there is strong support for the conclusion that the copper of the present catalysts is retained in the divalent state, belief being that the presence of the alkaline earth metal inhibits or retards reduction of copper to metallic state. In view of the unknown condition of the copper, the materials employed as catalysts in practice of the invention are referred to as copper-oxide of chromium-barium oxide compounds.

Variable amounts of copper, chromium and barium salts may be employed in making the herein catalysts, and copper as Cu, chromium as Cr and barium as Ba contents in the finished catalysts may vary to correspondingly substantial extent. In the finished catalysts, weight ratio of Ba to Cr to Cu may vary considerably within the range of 1:1.5:1.5 to 1:8:9, preferably substantially in the range of 1:2:2 to 1:6:7.

The catalyst may be used in conjunction with suitable supports such as alkaline earth fluorides, magnesium fluoride, or refractory oxides such as silica, alumina, and magnesia. Porous supports may be mixed with the initial precipitates, the resulting mass dried and decomposed, and the material so prepared reduced with hydrogen in the reactor as described. Amounts of carrier material may vary in the range of 0.1–10, preferably 0.1–1.0 the weight of the combined copper-chromium oxide-barium oxide catalytic component. All of the catalysts employed are characterized by the fact that the $Cr_2O_3$ component is a highly active form of chromium oxide, such form resulting from the described preparation processes in which, prior to use as a catalyst, the material containing the $Cr_2O_3$ component is heated to temperatures not in excess of 400–425° C., i.e. temperatures above which chromium oxide increasingly converts to a non-active form. The catalysts as used, disregarding any pellet binder incidentally present, preferably consist of copper-oxide of chromium-barium oxide, and may or may not be supported, and if supported, preferably consist of copper-oxide of chromium-barium oxide and the support. These catalysts exhibit high initial activity with no perceptible decrease in activity after 50 hours of continuous use.

Suitable apparatus may comprise preferably a tubular reactor, made of nickel or other suitable material such as Inconel, Monel and stainless steel, mounted in a furnace provided with means for maintaining the reaction zone in the reactor at the desired elevated temperature. The reactor may include inlets for introduction of controlled amounts of hydrogen and vaporous $CCl_2FCClF_2$, and may be provided with a reaction product exit connected directly to the inlet of a product recovery system.

Temperatures in which reactions may be carried out are substantially in the range of 325–425° C., and preferably in the range of 350–400° C. At temperatures lower than about 325° C. little or no reaction is obtained, whereas at temperatures above about 425° C. no advantages accrue, and there is notable increase in thermocracking of the $CCl_2FCClF_2$ with formation of undesired by-products.

The hydrogen and $CCl_2FCClF_2$ reactant may be mixed in any desired proportions. Hydrogen should be present in amount at least sufficient to react with a substantial amount of the starting material to form a substantial amount of the $CClF=CF_2$. An excess of hydrogen or equimolecular proportions may be employed. Ordinarily, the quantity of hydrogen lies in the range of 0.75–1.25 mols per mol of $CCl_2FCClF_2$. In large scale work, it is advantageous and preferable to adjust ratios of reactants, reaction temperatures and residence time so that hydrogen is substantially completely reacted, and hence it is preferred to utilize a little less than equivalent proportions of hydrogen even if recycling of larger amounts of $CClF_2CClF_2$ becomes necessary.

Contact time may vary considerably in the range of 0.1 to 50, preferably 5 to 10 seconds. Reaction rate at the temperatures specified is usually quite rapid, so that contact time is not particularly critical and depending upon particular operating conditions at hand may be determined by test run.

While sub- or super-atmospheric pressures may be employed, the invention affords the advantage of operation at substantially atmospheric pressure, and preferred modifications embody use of substantially atmospheric pressure. It will be understood that in the practice of gas-phase processes of the general type described herein, i.e. processes in which a gas stream is flowed successively thru reaction and product recovery systems, for all practical purposes, as relate to reactions themselves, pressure is considered as being substantially atmospheric. Actually, however, pressures in such systems are sufficiently on the positive side to effect commercially satisfactory gas flow thru the apparatus train. Thus, depending upon factors such as apparatus design, unpacked gas space in the reactor, desired contact time, etc., actual pressures in systems of the kind under consideration may vary from 2 up to say 10–15 pounds gauge, and accordingly operations of this type are included in the designation of substantially atmospheric pressure.

Products exiting the reaction zone comprise sought-for product $CClF=CF_2$ and some $CHF=CF_2$ together with any unreacted $CCl_2FCClF_2$ and possibly some hydrogen. The reactor exit may be water-scrubbed to remove HCl and HF, passed thru an aqueous NaOH solution to remove traces of residual acid, and dried as by $CaCl_2$. The organic portions of the reactor exit may be isolated by suitable cooling, as in an acetone-Dry Ice trap. By this procedure, unreacted hydrogen passes thru the trap while organics are condensed in the trap. The $CClF=CF_2$ product may be recovered from the condensate by fractional distillation.

The following illustrate practice of the invention. Conversions and yields are given in mol percent. Conversions are obtained by dividing mols of organic starting material consumed by mols of starting material fed, multiplied by 100; and yields, based on starting material converted to other products, are obtained by dividing mols of sought-for product by mols of starting material consumed, multiplied by 100.

*Example 1.*—This example illustrates preparation of a typical copper-chromium oxide-barium oxide catalyst suitable for use in practice of the invention. To about 900 ml. of water containing 260 g. $Cu(NO_3)_2.3H_2O$ and 31 g. $Ba(NO_3)_2$ at about 80° C. were added with stirring about 900 ml. of water solution containing 151 g. $(NH_4)_2Cr_2O_7$ and 225 ml. of 28% ammonium hydroxide. The resulting precipitate, comprising a complex of copper and barium hydroxides and ammonium chromate, $NH_4CrO_4$, was filtered. The cake was pressed, sucked dry, dried in an oven at about 80° C. for 12 hours, and pulverized to about 8–10 mesh. This granular material was subjected to decomposition by heating the same in open air, in such manner as to avoid violent reaction, at temperature of about 320–340° C., while stirring. Decomposition, involving evolution of nitrogen and water, was continued until the color of the material changed from orange thru brown to black. On cessation of gas evolution, the material contained by weight as CuO, about 43%; as $Cr_2O_3$, 46%; as BaO, 9.1%. Ba to Cr to Cu weight ratio was about 1:5:4.7. The material was pelletized to about ⅛″ x ⅛″ pellets. About 120 ml. of pelleted material were charged into a ⅝″ I.D. tubular alundum reactor, externally heated over 30″ of length by an electric furnace provided with an automatic temperature control, the material being disposed in a central 22″ length of the reactor. The material was treated by heating for about 4 hours at temperatures gradually increasing from 150° C. to about 400° C. while in the presence of a stream of hydrogen. The Ba to Cr to Cu weight ratio of the finished catalyst was the same as before hydrogen treatment, i.e. about 1:5:4.7. The catalyst material was then ready for use.

*Example 2.*—The catalyst employed, before hydrogen treatment, was in the form of ⅛″ x ⅛″ pellets and contained by weight as CuO, 41%; as $Cr_2O_3$, 47.2%; and as BaO, 11.8%. Ba to Cr to Cu weight ratio was about 1:3:3.1. This material was made by procedure similar to that described in Example 1. About 100 ml. of the pelleted material were charged into the reactor of Example 1, and were treated in the reactor by heating for about 5 hours at temperatures gradually increasing from 150° C. to 375° C. while in the presence of a stream of hydrogen. The Ba to Cr to Cu weight ratio of the finished catalyst was the same as before hydrogen treatment. Internal temperature in the reactor was held at about 375° C. A vaporous mixture consisting of 384 g. (2.06 m.) of $CFCl_2CF_2Cl$ (B.P. 47.7° C.) and about 2.5 m. (60 liters) of hydrogen was passed into and through the reactor at a substantially constant rate during a period of about 6.25 hrs., contact time being about 9 seconds. Exit products of the reactor passed through a water scrubber to remove most of the HCl and HF, through a 10% NaOH solution to remove traces of residual acid, through a $CaCl_2$ drying tower, and finally into a Dry Ice-acetone cooled trap in which the organics were condensed and collected, unreacted hydrogen exiting the cold trap. Fractional distillation of the cold trap liquid 284 g. resulted in the recovery of 121 g. (1.04 m.) of sought-for $CFCl=CF_2$ product (B.P. minus 26.2° C.); 1 g. (0.01 m.) of $CHF=CF_2$ (B.P. minus 62° C.); and 155 g. (0.83 m.) of $CFCl_2CF_2Cl$. Conversion of organic starting material to other products was about 59.5%; and yield of $CFCl=CF_2$, on the basis of the organic starting material converted, was about 85%.

*Example 3.*—The cataylst employed, before hydrogen treatment, was in the form of ⅛″ x ⅛″ pellets, and contained by weight about 19.5% sodium silicate binder; as CuO, 33%; as $Cr_2O_3$, 38%; and as BaO, 9.5%. Ba to Cr to Cu weight ratio was about 1:3:3.1. This material was made by procedure similar to that of Example 1. The pellets were reduced with a stream of hydrogen and nitrogen at about 150–350° C., and then hydrogen alone at 350° C. for about 5 hours. Ba to Cr to Cu weight ratio of the finished catalyst was the same as before hydrogen treatment. For a period of about 45 hrs., $CFCl_2CF_2Cl$ and hydrogen were charged into the reactor in mol ratio of about 1:1, and reactor temperatures were maintained at about 375° C. In this interval $CClF=CF_2$ was produced, and during the latter 43 hrs. of the run conversions were in the range of 42–65%, averaging about 52%. Subsequent to the 45 hour operation, a vaporous mixture consisting of 320 g. (1.7 m.) of $CFCl_2CF_2Cl$ and 1.7 m. (41 liters) of hydrogen was reacted, during a period of 6.5 hours, at temperature of 375° C. as described above. On fractional distillation of the 265 g. of condensate caught in the Dry Ice-acetone cold trap, there were obtained about 78 g. (0.67 m.) of $CFCl=CF_2$; 2 g. (0.025 m.) of $CHF=CF_2$; and about 175 g. (0.94m.) of unreacted $CFCl_2CF_2Cl$. Conversion of starting material was about 39%, and yield of $CFCl=CF_2$, on the basis of organic starting material converted, was about 88%.

*Example 4.*—The catalyst employed, before hydrogen treatment, was in the form of $3/16''$ x $1/8''$ pellets and contained by weight about 6% polyvinylacetate latex binder; as CuO, 42%; as $Cr_2O_3$, 40%; and as BaO, 12.0%. Ba to Cr to Cu weight ratio was about 1:2.5:3.1. This material was made by procedure similar to that of Example 1. About 100 ml. of pelleted catalyst were charged to the reactor, and treated therein with a stream of hydrogen at temperature of about 150–375° C. for about 5 hours. The Ba to Cr to Cu weight ratio of the finished catalyst was the same as before hydrogen treatment. A vaporous mixture consisting of 195 g. (1.04 m.) $CFCl_2CF_2Cl$ and 1.91 mols (44 liters) of hydrogen was reacted, during a period of about 4.75 hours, at temperature of about 375° C. substantially as described above. On fractional distillation of the 139 g. of condensate caught in the Dry Ice trap, there were obtained about 57 g. (0.49 m.) of $CFCl=CF_2$; and about 75 g. (0.40 m.) of unreacted $CFCl_2CF_2Cl$. Conversion of starting material was about 47.5%, and yield of $CClF=CF_2$, on the basis of organic starting material converted, was about 77%.

In all of the runs of Examples 2–4, pressure in the reactor was about 2 p.s.i.g., i.e. substantially atmospheric. In none of the runs was there found any detectable amount of $CF_2=CF_2$.

We claim:

1. The process for making chlorotrifluoroethylene which comprises subjecting $CCl_2FCClF_2$ in a reaction zone to the action of hydrogen in a quantity sufficient to react with a substantial amount of said $CCl_2FCClF_2$ while maintaining a temperautre substantially in the range of 325–425° C. and while in the presence of a catalyst which has been precipitated from a solution containing ammonium dichromate, a soluble salt of copper and a soluble salt of an alkaline earth metal, which precipitated catalyst has been ignited at elevated temperatures to liberate nitrogen and water until the precipitated catalyst becomes substantially dark brown to black in color, and recovering $CClF=CF_2$ from the resulting reaction product.

2. The process for making chlorotrifluoroethylene which comprises subjecting $CCl_2FCClF_2$ in a reaction zone to the action of hydrogen in a quantity sufficient to react with a substantial amount of said $CCl_2FCClF_2$ while maintaining a temperature substantially in the range of 325–425° C. and while in the presence of a catalyst which has been precipitated from a solution containing ammonium dichromate, a soluble salt of copper and a soluble salt of barium, which precipitated catalyst has been ignited at elevated temperatures to liberate nitrogen and water until the preciiptated catalys becomes substantially dark brown to black in color, and recovering $CClF=CF_2$ from the resulting reaction product.

3. The process for making chlorotrifluoroethylene which comprises subjecting $CCl_2FCClF_2$ in a reaction zone to the action of hydrogen in a quantity sufficient to react with a substantial amount of said $CCl_2FCClF_2$ while maintaining a temperature substantially in the range of 325–425° C. and while in the presence of a catalyst which has been precipitated from a solution containing ammonium dichromate, a soluble salt of copper and a soluble salt of barium, which precipitated catalyst has been ignited at elevated temperatures to liberate nitrogen and water until the precipitated catalyst becomes substantially dark brown to black in color, in which precipitated and ignited catalyst the weight ratio of Ba:Cr:Cu is substantially in the range of 1:2:2 to 1:6:7, and recovering $CClF=CF_2$ from the resulting reaction product.

4. The process of claim 2 in which the weight ratio of Ba:Cr:Cu in the catalyst is substantially in the range of 1:1.5:1.5 to 1:8:9.

5. The process of claim 1 in which temperature is maintained substantially in the range of 350–400° C.

6. The process of claim 1 in which the quantity of hydrogen lies substantially in the range of 0.75–1.25 mols of hydrogen per mol of $CCl_2FCClF_2$.

7. The process of claim 3 in which pressure is substantially atmospheric.

References Cited

UNITED STATES PATENTS 2,697,124  12/1954  Mantell _____ 260—653.5

FOREIGN PATENTS 577,179  6/1959  Canada.
1,163,323  9/1958  France.

LEON ZITVER, *Primary Examiner.*

DANIEL D. HORWITZ, *Examiner.*